United States Patent
Lanzafame et al.

(10) Patent No.: US 8,054,171 B1
(45) Date of Patent: Nov. 8, 2011

(54) PROGRAMMING AN EXISTING INDICATOR TO INDICATE THE CAUSE OF A CONDITION

(75) Inventors: Christopher Lanzafame, Ocean Township, NJ (US); Christopher Moran, Middletown, NJ (US); Richard Szajdecki, Jackson, NJ (US)

(73) Assignee: Avaya Inc., Basking Ridge, NJ (US)

( * ) Notice: Subject to any disclaimer, the term of this patent is extended or adjusted under 35 U.S.C. 154(b) by 365 days.

(21) Appl. No.: 12/049,355

(22) Filed: Mar. 16, 2008

(51) Int. Cl.
*G08B 21/00* (2006.01)
(52) U.S. Cl. .................... 340/459; 340/458; 340/534
(58) Field of Classification Search .............. 340/458, 340/459, 534
See application file for complete search history.

(56) References Cited

U.S. PATENT DOCUMENTS

| | | | | |
|---|---|---|---|---|
| 3,872,424 A | * | 3/1975 | Enabnit | 340/442 |
| 3,975,708 A | * | 8/1976 | Lusk et al. | 340/458 |
| 4,739,309 A | * | 4/1988 | Brauninger et al. | 340/534 |
| 5,367,297 A | * | 11/1994 | Yokoyama | 340/984 |
| 2009/0096597 A1 | * | 4/2009 | Avery et al. | 340/435 |

* cited by examiner

*Primary Examiner* — Jennifer Mehmood
*Assistant Examiner* — Mark Rushing
(74) *Attorney, Agent, or Firm* — Sheridan Ross P.C.

(57) ABSTRACT

A method and apparatus for allowing a troubleshooter to reuse existing indicators, such as displays, LEDs, or specialized indicators, for a purpose other than the indicator's usual purpose. In response to an initial occurrence of a problem, the troubleshooter modifies the indicator's behavior to indicate a later occurrence of a fault or a set of faults, which may be the cause of the problem. Upon the later occurrence of the problem, the indicator is monitored for simultaneous notification of occurrence of the fault. After the problem is triaged, the modified indicator is returned to its original use. The notification from the indicator can be sensory, i.e., auditory, visible, or tactile. The indicator's change in behavior can occur after the fault happens once or an administrable threshold number of times, or intermittently. Alternatively, the change in behavior may become semi-permanent if the fault continues to occur for some administrable number of times.

22 Claims, 2 Drawing Sheets

PROGRAMMING AN EXISTING INDICATOR TO INDICATE THE CAUSE OF A CONDITION

TECHNICAL FIELD

The method and apparatus relate to the field of diagnosing problems.

BACKGROUND OF THE INVENTION

For diagnostic purposes, the person who is diagnosing the problem, i.e., troubleshooter, may rely on indicators that have a fixed purpose. For example, for catastrophic problems that require immediate attention, such as, if a car's engine oil pressure is low, a single purpose "check oil" light on the dashboard turns on. Similarly, when a car door is ajar, there may be a special indicator on a liquid crystal display (LCD) or an audible message, notifying the driver to close the car door. Likewise, when the driver and/or passenger are not wearing their safety belt, an indicator on an LCD may light or an audible message may tell the driver that a safety belt is not properly on. These indicators' function cannot be modified to have a different function for troubleshooting purposes.

Non-catastrophic car problems often are difficult to troubleshoot. An indicator, such as the "check oil" light, may provide visible notification of a generic problem, but the computer error code that identifies the specific problem may be hidden under a car seat, carpeting, or in the trunk, and may not be visible while driving the car. For example, Honda provides a light emitting diode (LED) under the carpet on older models that flashes 1-20 times. If the error code is 92, there are nine flashes followed by two flashes. On newer models, the LED presents two digits. The error code appears to be a fixed function that indicates one error even when there may be multiple problems. Below are two examples of two Honda error codes, and a more comprehensive list is available at http://www.c-speedracing.com/faq/05.php

| 91 | 96-98 Civic<br>97-98 Prelude<br>94+ Integra | Fuel Tank Pressure Sensor low input |
|---|---|---|
| 92 | 96-98 Civic<br>97-98 CRV<br>96-98 Prelude<br>94+ Integra | Evaporative Emission Control System insufficient purge flow |

In addition, stored performance information from the car's computer may not be downloadable, or accessing thereof may require specialized equipment.

Hesitation is an example of a difficult car problem to troubleshoot. The difficulties arise as the troubleshooter attempts to correlate the time when the troubleshooter perceived the hesitation with the error codes stored in the car's computer log. Hesitation may happen regularly or intermittently, and may be due to various causes, such as, mechanical or electrical. To make matters worse, at the time of the perceived hesitation, the car's computer log may record an error code 138, but reset or overwrite the error code when the computer's log memory is full.

The car industry is not the only industry that uses indicators that are not multifunctional for troubleshooting purposes. Communication equipment, such as, routers, gateways, switches, and port boards within the equipment, etc., use LEDs to indicate the various states that the electronic product may enter and exit. For example, an electronic product may have several multi-colored LEDs. If a green LED is steadily on, then the product is operating normally. If a yellow LED is steadily on, the product may have experienced a problem. If a red LED is steadily on, then the electronic product may be off-line. Alternatively, a single LED may indicate a change in state by flashing on and off for a variable period. For example, the LED may be flashing on for a long period of time and off for a short period. Conversely, the LED may be flashing on for a short period and flashing off for a long period. These LEDs are visible and provide state information, but the troubleshooter cannot modify the LED's behavior to help the troubleshooter correlate the time when the troubleshooter notices a problem with an error logged by a computer.

Troubleshooting problems on communication equipment, and especially on a converged network, is difficult. A converged network's operation is complicated and includes specialized communication equipment providing voice communications over a packet network, such as, Voice over Internet Protocol (VoIP). Specialized communication equipment may include call-processing stored program code and a VoIP interface board. The call-processing stored program code (i.e., software and firmware) completes transmission requests for voice, data, and video. The VoIP interface board converts media types, such as, analog or digital, to Internet Protocol (IP), thereby allowing conversations to occur between an analog phone and an Internet Protocol (IP) phone. In the communication equipment, call-processing stored program code and/or the VoIP interface board compute error codes for quality-of-service (QoS) faults. QoS faults include but are not limited to the following: loss of packets of data (packet loss); packet jitter (variation in time between data packets arriving, which may be due to network congestion, changes in packet routing, and timing issues); and out-of-order packets; etc. Packet loss and jitter are examples of two transient faults that cause voice impairments, drop fax and modem calls on converged networks, and disrupt telecommunications device for the deaf/telephone typewriter (TTY/TDD) calls.

The most troublesome faults are from outside of the boundaries of the enterprise network, and are outside of the enterprise's control, which leads to joint debugging sessions between multiple companies to solve a particular customer's problem. Packet loss due to network traffic may occur anywhere in the network path. Pinpointing the specific communication equipment that is causing the packet loss is often extremely difficult to determine in real-time by using current troubleshooting techniques. Current troubleshooting techniques include the following: using hardware or software based network sniffers; sending test packets between the near and far end of the call; performing dynamic calculations on the test packets between both ends of the call using the test data; and could include providing an endpoint with an audio or visible indication of the network QoS performance based on the dynamic calculations. Alternatively, the far end of the call can send a message to the near end of the call regarding the QoS of the call. The display can use the telephone's LED or other visible or audible means to convey the QoS information.

These troubleshooting techniques do not help correlate the customer's complaint or perceived problem, such as "I hear clicking on my phone calls," with a recorded fault (ex. error code) in the error log. The troubleshooter will ask the customer what time did the clicking occur? The troubleshooter peruses the error log. Typically, there are many errors, and some time-stamps are not easily decipherable. Time-stamps are based on the communication equipment's clock, which may be incorrectly set to standard or daylight savings time. Alternatively, the clock may be synchronized to another clock, but has lost its synchronization. These problems make it difficult for the troubleshooter to correlate the time-stamp of the error in the error log with the time when the customer thought the transient problem occurred. Hence, the troubleshooter must wait for the problem to recur, and the cycle repeats.

SUMMARY OF THE INVENTION

What is needed is a method and apparatus allowing a troubleshooter to reuse one or more existing indicators, such as displays, LEDs, or specialized indicators, by modifying an indicator's behavior to provide notification of a possible cause of a next occurrence of a fault or set of faults. The indicator may reside in, for example, an endpoint device or a network device. The notification from the indicator can be tactile (ex., vibration), audio (ex., a beep), or visible (ex., LED flashing). The indicator's behavior may be modified after the fault happens once, an administrable threshold number of times, or intermittently. Alternatively, the indicator's modified behavior may become semi-permanent if the fault continues some administrable number of times.

Several embodiments address the problems and disadvantages of the prior art. A first embodiment is a method of diagnosing problems, comprising the steps of:

i. in an absence of a problem, using an indicator for a first purpose other than notification of a possible cause of said problem;

ii. in response to a first occurrence of said problem, modifying said indicator's behavior to provide notification of a possible cause of a next occurrence of said problem; and iii. in response to a later occurrence of said problem, said indicator providing said notification of said possible cause of said next occurrence of said problem.

Illustratively, the first embodiment further comprises the steps of: correlating said later occurrence of said problem with said notification of said possible cause of said next occurrence of said problem; and returning said indicator to its first purpose after said problem is triaged. Illustratively, said notification is selected from a group comprising: an audible, visible, and tactile notification; and said notification of said possible cause of said next occurrence of said problem occurs before returning said indicator to its first purpose. Furthermore, said modified indicator's behavior is illustratively selected from a group comprising: a semi-permanent change in behavior when the problem occurs once, and a change in behavior when the problem occurs after an administered threshold.

A second embodiment is an apparatus for diagnosing problems, comprising:

i. means for using an indicator, in an absence of a problem, for a first purpose other than providing notification of a possible cause of said problem; and ii. means for modifying said indicator's behavior in response to a first occurrence of said problem to provide notification of a possible cause of a next occurrence of said problem, whereby said indicator is adapted to provide said notification of said possible cause of said next occurrence of said problem.

Preferably, the apparatus of said second embodiment further comprises: means responsive to a later occurrence of said problem, for correlating said later occurrence of said problem with said notification of said possible cause of said next occurrence of said problem; and means for returning said indicator to its first purpose after said problem is triaged. Illustratively, said notification is selected from a group comprising: an audible, visible, and tactile notification.

A third embodiment is a method of diagnosing problems in a suspect device operating in a communications network, comprising the steps of:

i. in an absence of a problem in said communications network, using a programmable indicator for a first purpose other than providing notification of a possible cause of an occurrence of said problem;

ii. in response to a first occurrence of said problem in said communications network, reprogramming said indicator's behavior to provide notification of a possible cause of a next occurrence of said problem;

iii. in response to a later occurrence of said problem in said communications network, said indicator providing said notification of said possible cause of said next occurrence of said problem;

iv. correlating said later occurrence of said problem with said notification of said next occurrence of said problem; and v. returning said indicator to its first purpose after said problem is triaged.

A fourth embodiment is a system for assisting in diagnosis of problems, the system comprising:

a programmable indictor, in an absence of a problem, having a first purpose other than providing notification of a fault that is possibly causing the problem; and at least one computer responsive to a first occurrence of said problem, for reprogramming said indicator's behavior to provide notification of an occurrence of at least one fault that is possibly causing said problem, whereby said programmable indicator is adapted to provide notification of a next occurrence of said at least one fault that is possibly causing said problem. Preferably, said computer is responsive to a later occurrence of said problem, for correlating said later occurrence of said problem with said notification of said next occurrence of said at least one fault that is possibly causing said problem, and for returning said indicator to its first purpose after said problem is triaged.

The various embodiments are applicable to diagnosing problems in a wide variety of environments. In a first example, the various embodiments allow the troubleshooter, i.e., driver and/or mechanic, to diagnose one or more car problems. In response to a first problem, the troubleshooter modifies an indicator's behavior to provide visible, audible, or tactile notification when a selected fault, i.e., possible cause of the problem, next occurs. The problem can be intermittent or persistent. At the next occurrence of the selected fault, the car's computer will send the appropriate control message to the selected indicator to operate in a manner that is different from its pre-modified use. The troubleshooter or diagnosing apparatus then correlates the next occurrence of the problem with the selected fault, thereby triaging the problem without the need to search an error log after the problem first occurs.

The reuse of existing car indicators may include but is not limited to selecting the following: the car's headlamps or dashboard lights flashing on and off; using the horn; having one or more specific radio stations, a compact disc, tape player, car phone or MP3 device activated; or having the computer announce through the speakers that the exposed fault (ex. computer error code) occurred. Alternatively, the indicator can be a specialized indicator, such as, a check engine light, or a message may scroll across a menu screen that the exposed fault has been computed.

Furthermore, the troubleshooter may utilize stored program code in the car's computer to modify the indicator's behavior. Alternatively, the troubleshooter may adapt electronically or mechanically the existing indicator or parts that control the indicator to modify the indicator's behavior.

In a second example, problems that are causing voice and data impairments on a converged network are triaged locally or remotely. For example, the troubleshooter selects to expose a fault or faults based on the customer's description of the problem, and the network communication device that is most likely experiencing the problem on the converged network. The troubleshooter proceeds to modify an indicator's behavior on the suspected device to expose a known fault or state that is monitored by the system, which may be the possible cause of the problem. Furthermore, the troubleshooter selects the type of sensory notification and pattern to alert at the next occurrence of the problem, such as, visible, audible, or tactile. At the next occurrence of the exposed fault, the troubleshooter, customer, or apparatus attempts to correlate the problem with the exposed fault. Examples of faults that may be exposed at system telephony interfaces and that show the source of the problem to be outside of the network communications device include but are not limited to packet loss, low signal level, echo, overload distortion, background noise, etc.

An indicator maybe computer controlled, but a computer may or may not directly control the indictor. One example of direct computer control is an LED controlled by a processor port pin to indicate power is on or off in a personal computer. Alternatively, an LED may be directly controlled by a field programmable gate array (FPGA) rather than directly via computer. The FPGA may be electronically adapted and thereafter allow stored program command to control the LED and allow a user to administer, i.e., modify the LED's behavior to provide notification of a possible cause of a next occurrence of a problem. For example, the pins from Ethernet chip's physical device or line interface (PHY) communicate directly thru an FPGA, then communicate to an LED. The LEDs connected to the PHY pins first purpose, other than notification of a possible cause of a problem, is to reflect the status of the Ethernet interface: transmitting (TX), receiving (RX), and what speed (10 Mbytes/s or 100 Mbytes/s). One skilled in the art may electronically adapt the FPGA to allow direct computer control and allow a user to administer, i.e., modify the LEDs behavior, i.e., to set the LED pin state and light the LED in response to a later occurrence of a problem and hence provide notification of the possible cause of the next occurrence of the problem.

Note, the various embodiments described could be a feature that is constantly available, or it may be part of a service mode that the IP interface or IP phone could be put into in the event of a customer complaint.

Note, the type of indicator is not limited to the reuse of LEDs, but may use any indicator that is available on the electronic equipment, to troubleshoot intermittent or consistently occurring faults. As previously mentioned, indicators do not need to be directly controlled by a computer, but may be directly controlled by a FPGA, programmable logic device (PLD), microprocessor control or user controlled. Examples of computer controlled indicators may include the following: the light that indicates "power" on a personal computer; the on/off switch on a person computer; etc. Examples of indicators that are user controlled may include the following: car radio station memory buttons; the button used to pick between an AM and FM radio; etc.

The method of notification may be to provide an audible message to the customer, provide text information through a display, or provide sensory information through a cell phone set in vibrate mode or a TDD/TTY device.

Instead of modifying an indicator on an end user's endpoint device, the troubleshooter can modify the behavior of an existing indicator, for example, an LED on a network communication device, such as, a port board, router, gateway, to flash in a completely different manner than in its normal use, when a fault occurs, for example, packet loss.

The troubleshooter may access, locally or remotely, the stored program code, which allows the selection and modification of an indicator and the notification pattern. The stored program code may also perform the iterative troubleshooting steps with the assistance of the troubleshooter or customer. The stored program code employing the method to diagnose problems may reside on every network communication device or on a central computer.

Furthermore, the troubleshooter may utilize stored program code in a device that is part of the converged communication network to modify an indicator's behavior. Alternatively, the troubleshooter may adapt electronically or mechanically the existing indicator or parts that control the indicator to modify the indicator's behavior.

BRIEF DESCRIPTION OF THE DRAWING

These and other features and advantages of the method and apparatus will become more apparent from considering the following description of an illustrative embodiment of the method and apparatus together with the drawing, in which.

DETAILED DESCRIPTION

Figure 1:
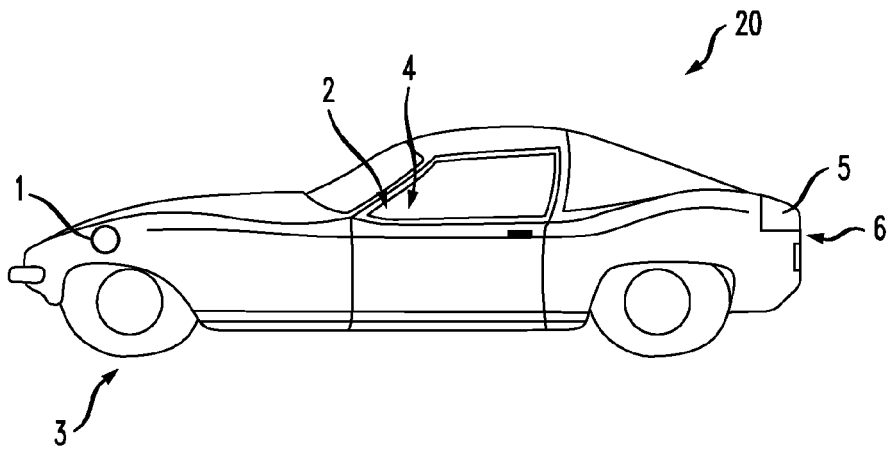
FIG. 1 is an exemplary figure of a car and its computer.

FIG. 1 is an exemplary side view of a car 20. The figure shows a headlamp 1 at the front of the car, a horn 2 inside the car, two of four wheels 3, dashboard 4 inside the car, and computer 6 for operating the car residing inside a trunk 5. Alternatively, the computer 6 may not reside in the trunk, but elsewhere, such as, under one of the car seats or under the hood of the car. Stored program code may be used to operate each component in the car 20, determine when a fault occurs and implement the notification of an exposed fault. Stored program code may also be used to correlate a later occurrence of a problem with the notification of the next occurrence of an exposed fault, and restore the indicator's behavior to its original purpose.

The stored program code may include proprietary software or software otherwise known as "freeware or open source." The stored program code may be, for example, application software, operating system software, or middleware, that controls and co-ordinates distributed systems and resides on one or more computers. Alternatively, the stored program code may be firmware and may reside in various media. In a further alternative, the stored program code may reside in a hardware device, such as in a microcontroller or in flash memory. In yet another alternative, the stored program code can be uploaded as a binary image file to the hardware device.

Figure 2:
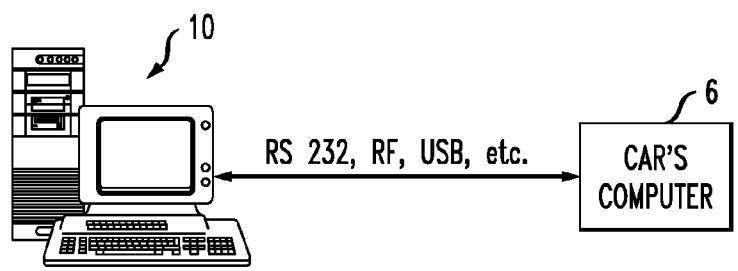
FIG. 2 is an exemplary method of interfacing to the car's computer.

FIG. 2 shows an exemplary method of interfacing a computer to the computer 6 of car 20. In FIG. 2, the troubleshooter may administer the computer 6 by interfacing a laptop or desktop computer 10 thereto, for example, by using an RS-232 or USB cable, or wirelessly by radio frequency (RF) or infrared (IR), or by using a specialized cable interface, etc. The laptop or desktop computer 10 has stored program code that can read information from computer 6, download information to computer 6, and modify stored program code in computer 6.

The modifications to stored program code may be performed, for example, by using a command line interface or a graphical user interface. The laptop or desktop computer 10 may use client software that is provided by the car manufacturer or a third party vendor to diagnose problems on the car 20. Additionally, the laptop or desktop computer 10 may have Internet access to download information, such as, software or firmware updates from the car manufacturer, for example, via a World Wide Web portal. In a further alternative, the computer 6 may allow the troubleshooter to modify stored program code in computer 6, locally or remotely, via menus without the need for laptop or desktop computer 10. Alternatively, an existing display within the car 20 may be used, as for example, using the LCD screen (not shown) available on the dashboard of many cars. In yet a further alternative, the computer 6, or laptop or desktop computer 10, has the stored program code to automatically select new faults, methods of notification, and notification patterns that can be used to triage the car's 20 problem.

Figure 3:
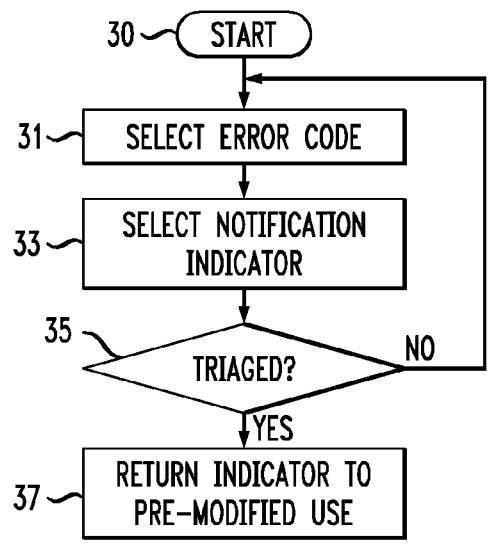
FIG. 3 is a flow diagram describing the steps in the method.

In the case of a problem occurring in the car 20, such as, car hesitation, a driver will bring the car 20 to the mechanic, i.e., troubleshooter. FIG. 3 is a flow diagram describing the steps of the method. The driver and mechanic discuss the perceived problem, which is hesitation. After the mechanic appropriately interfaces computer 10 to the computer 6, in step 31, the mechanic looks at the car manufacturer's computer 6 error codes, either via the computer 6, a shop manual, or online via the World Wide Web, to see which error code correlates most closely with hesitation. The mechanic sees that it may be computer error 138: the carburetor may not be operating properly. The computer 6 may be menu driven or have a command line interface. In one embodiment, the mechanic maybe allowed to perform one or more of the following: choose an error code from a variety of error codes, at least one indicator to modify, and a behavior pattern for the indicator. In step 33, the mechanic selects a notification indicator. After discussing the troubleshooting method with the driver, both may agree that turning on the dashboard lights (on dashboard 4) on and off a number of times (ex. three times) when computer 6 next computes error code 138, is non-obtrusive while the car is in motion. The mechanic may keep the car for some amount of time, or the driver may drive the car for some amount of time, such as an hour or days, before the "hesitation" occurs again. Additionally if the car has the appropriate communication infrastructure, the mechanic may decide to administer the car's communication system to send him a message, in any modality, such as a page, SMS text message, fax, email, or voice call when the indicator provides notification of the next occurrence of the possible problem. In a further alternative, laptop or desktop computer 10 may have stored program code to reproduce the perceived problem, i.e., hesitation.

Upon a later occurrence of the problem, the mechanic or driver perceives the car hesitating. The mechanic may ask the driver, "Did the dashboard lights turn on and off three times when you next felt the car hesitate?" The driver may reply, "Yes, I was watching for that and I have made that correlation." With this information, the mechanic in step 35 determines that he has selected the correct error code to expose as the possible problem because the driver correlated the later occurrence of hesitation with the notification of the next occurrence of computer 6 diagnosing error code 138. In this example, the mechanic has triaged the problem quickly without the need to review the car's computer error log, which may be a tedious task, thereby shortening the amount of time spent actually troubleshooting this problem and reducing the mechanic's service bill. In step 37, the mechanic is satisfied that the problem is understood, and he returns the dashboard lights to their pre-modified use.

However, if the driver replies, "No, the dashboard lights did not turn on and off three times when I felt the car hesitate," then the problem is not resolved in step 35. Returning to step 31, the mechanic can modify the stored program code in the computer 6 to expose another error code that closely matches the symptoms. For example, the mechanic may then decide that error code 140 is also applicable, as this error code may indicate that one or more spark plugs are misfiring, and therefore decides to expose error code 140. Repeating step 33, the mechanic modifies the computer 6 to turn the check engine light (on dashboard 4) on and off three times when the computer 6 diagnoses error code 140. The mechanic or driver proceeds to drive the car 20. At the next occurrence of hesitation, if the car's check engine light turns on and off three times, the mechanic or driver makes the correlation and determines the possible cause of the hesitation is indicated by error code 140. The mechanic may consider the problem is triaged in step 35 and fix the spark plug misfiring problem. In step 37, after the problem is triaged, the mechanic returns the two indicators, the dashboard light and the check engine light, to their normal operating use. Alternatively, the stored program code of computer 6 may automatically return the notification indicator to its pre-modified use without the need for the mechanic to do so. This may be the case after the hesitation is resolved and/or the computer does not compute the exposed error code anymore.

In an alternative embodiment, the laptop or desktop computer 10 or computer 6 may contain stored program code to reproduce the perceived problem, intelligently select one or more faults to expose, receive input and output from the car, receive input from the mechanic, and repeat the diagnostic process until the problem is triaged. In step 31, the mechanic may enter a perceived problem as "hesitation." The stored program code may list various possible faults to expose, such as 138 or 140. The mechanic or the stored program code may decide which fault to expose first. For example, the stored program code may chose to expose error code 138 first. In step 33, the mechanic or stored program code may choose what indicator to use for notification and how to modify its behavior pattern. If the stored program code chooses the indictor, it will alert the mechanic as to its choices for indicator and behavior pattern modification. It may also request the mechanic to select a feedback mechanism, such as, input into desktop 10 or computer 6, to confirm when the mechanic or driver perceives the problem to occur next. The feedback confirms when the mechanic or driver correlates the next occurrence of the problem with the notification of the next occurrence of the exposed fault. Also, this feedback mechanism helps the stored program code to determine whether the mechanic has accurately selected the correct fault to expose in the first place. If the stored program code reproduces hesitation in the car, but the mechanic does not confirm the problem as hesitation, then the stored program code can alert the mechanic that the perceived problem was mislabeled as hesitation and that the mechanic needs further discussions with the driver to understand more about the perceived problem. However in step 35, if the mechanic indicates the mechanic did correlate the next occurrence of the perceived problem with notification of the next occurrence of the exposed fault, then the stored program code may consider the problem as having been triaged, and provide the mechanic with a list of actions to fix the perceived problem. In step 37, if the stored program code cannot reproduce the problem or does not compute the exposed error code, the stored program code may consider the problem resolved and return the notification indicators to their original purpose.

As previously mentioned, the notification indicator can be auditory (a beep from a car horn), visible (which includes text scrolling across a display) or sensory (Braille or a phone in vibration mode). For example, if the mechanic is deaf, then a notification may be transmitted from the computer 6 to an endpoint device such as a Telecommunications Device for the Deaf/TeleTYpewriter (TDD/TTY) device (44 shown in FIG. 4). However, if the mechanic is not deaf and computer 6 or computer 10 has the appropriate supporting communication infrastructure, then an event may be triggered and the notification may be transmitted to an endpoint device. The notification may be a message to a pager or cell phone (not shown) that is set to ring or vibrate, or a message scrolling across a display (not shown), etc., to alert the mechanic to finish their coffee break and get back to the car because the problem has recurred.

The indicator's change in behavior can occur after the fault happens once. Alternatively, if the fault happens an administrable threshold number of times, the indicator's change in behavior may occur intermittently. In another alternative, the change in behavior may become "sticky," that is, semi-permanent, if the fault continues to occur for some administrable number of times.

Figure 4:
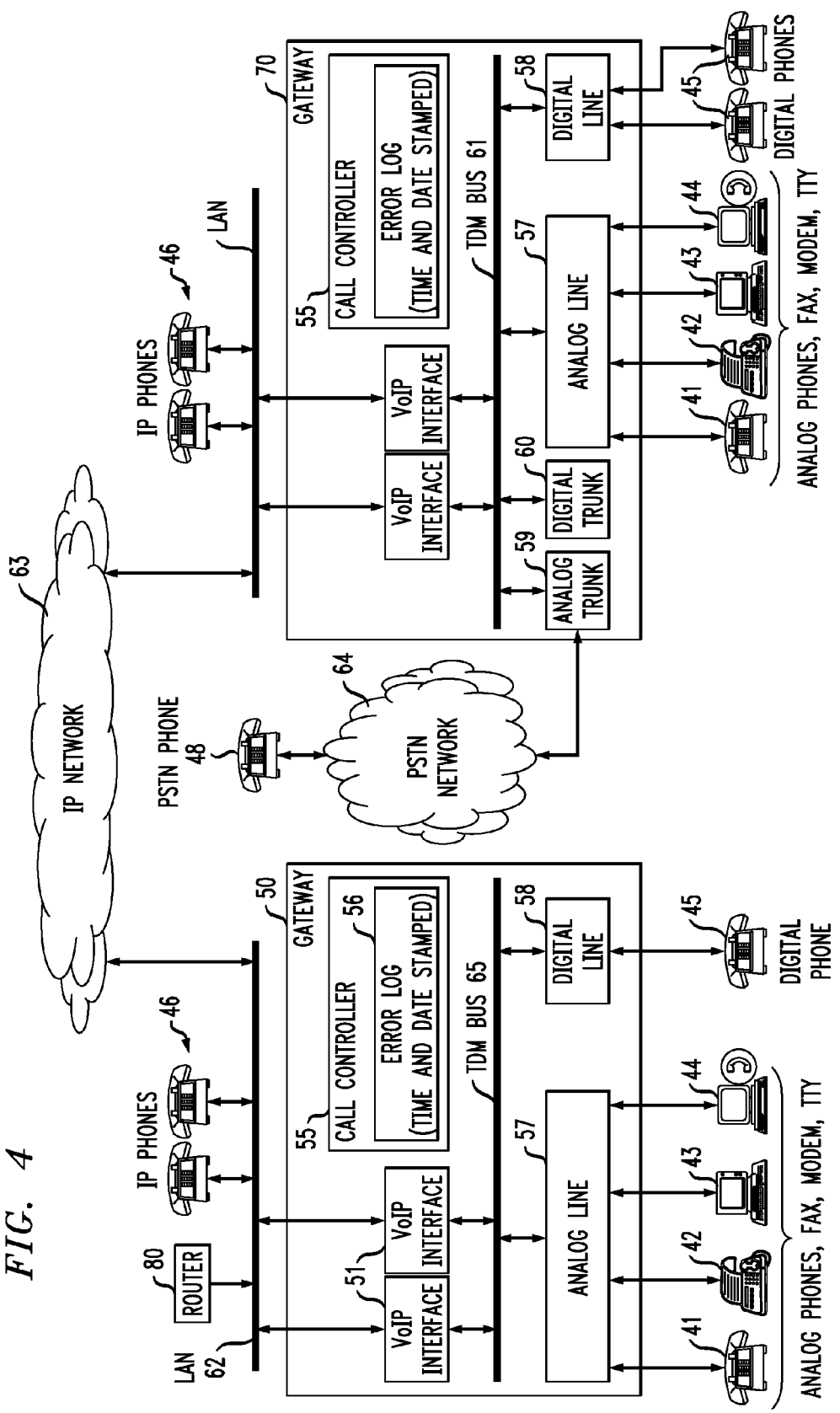
FIG. 4 is an exemplary block diagram of a communications network employing the method to diagnose problems.

FIG. 4 shows a block diagram of an exemplary communications network that employs the method and apparatus to diagnose voice impairment problems. As shown in FIG. 4, examples of endpoint devices are analog phone 41, facsimile 42, modem in desktop or laptop computer 43, Telecommunications Device for the Deaf/TeleTYpewriter (TDD/TTY) terminal 44, digital phone 45, IP softphone client on a laptop computer or on a handheld device, internet protocol (IP) desktop phone 46, and phone communicating via the PSTN 48. Although not shown, endpoint devices may also include cellular phones, wireless access points, and other handheld devices such as a Blackberry® device or a PALM® device. The IP softphone client on a laptop device or IP desktop phone 46 may include the stored program code to allow it to communicate via one or more VoIP signaling protocols such as H.323, Session Initiation Protocol (SIP), Media Gateway Control Protocol (MGCP), etc. A network device may be a router, a port board operating in a gateway or a Public Branch Exchange (PBX), etc.

Gateways 50 and 70 convert analog data, such as voice from an analog phone 41, data from facsimile 42, or modem 43, to packets of data conforming to the Internet Protocol (IP). Also, each gateway 50 and 70 includes call controller 55, which routes voice, data, image, and video transmissions. Call controller 55 is also known as Call Server, Gatekeeper (an H.323 term), Media Gateway Controller (an H.248 term), and SIP Controller (a SIP term). Call controller 55 contains stored program code and allows connections to private and public switched telephone networks (PSTNs) 64, Ethernet local area networks (LANs) 62, ATM networks (not shown), and the Internet 63.

Call controller 55 may have stored program code that uses H.323 and/or SIP, which are the two prevalent protocols used for Internet Protocol (IP) telephony. Real-Time Protocol (RTP) is used in both H.323 and SIP to transport the real-time application data such as voice or video. RFC 3550-RTP: A Transport Protocol for Real-Time Applications, Schulzrinne, et. al. (July 2003), which is hereby incorporated by reference herein, describes RTP as providing "end-to-end network transport functions suitable for applications transmitting real-time data, such as audio, video, or simulation data, over multicast or unicast network services. RTP does not address resource reservation and does not guarantee quality-of-service for real-time services. The data transport is augmented by a control protocol (RTCP) to allow monitoring of the data delivery in a manner scalable to large multicast networks, and to provide minimal control and identification functionality. RTP and RTCP are designed to be independent of the underlying transport and network layers . . . . Applications typically run RTP on top of UDP to make use of its multiplexing and checksum services; both protocols contribute parts of the transport protocol functionality . . . . Note that RTP itself does not provide any mechanism to ensure timely delivery or provide other quality-of-service guarantees, but relies on lower-layer services to do so. It does not guarantee delivery or prevent out-of-order delivery, nor does it assume that the underlying network is reliable and delivers packets in sequence. The sequence numbers included in RTP allow the receiver to reconstruct the sender's packet sequence, but sequence numbers might also be used to determine the proper location of a packet, for example in video decoding, without necessarily decoding packets in sequence . . . . This document defines RTP, consisting of two closely-linked parts: [a] the real-time transport protocol (RTP), to carry data that has real-time properties; [b] the RTP control protocol (RTCP), to monitor the quality of service and to convey information about the participants in an on-going session. The latter aspect of RTCP may be sufficient for 'loosely controlled' sessions, i.e., where there is no explicit membership control and set-up, but it is not necessarily intended to support all of an application's control communication requirements. This functionality may be fully or partially subsumed by a separate session control protocol, which is beyond the scope of this document."

To analyze voice impairments during an individual call or a conference call on a converged network, the troubleshooter can monitor the received RTP voice packets on the near end of the call. The troubleshooter does not need to monitor the RTCP messages regarding what the far-end of the call is experiencing. If the network equipment performs jitter computations and keeps track of packet loss, these transient faults can be exposed. The various embodiments make use of RTP packet timestamps, sequence numbers, and packet arrival time (the time the system thinks the packet arrived) to determine packet loss, jitter, and packets received out-of-order. The various embodiments do not require specialized equipment, such as, network sniffers. Instead, even the non-technical customer is able to participate and quickly correlate an exposed fault with the symptom described by the customer.

In an example VoIP transmission, if analog device 41-44 that is administered on gateway 50 desires to communicate with an IP phone 46 that is administered on gateway 70, analog line card 57 takes the analog data, digitizes the data and places it on the time division multiplex (TDM) bus 65. On command from the call controller 55 of gateway 50, the VoIP interface card 51 takes the digital data from the TDM bus 65 and places it in the payload of at least one RTP packet. The call controller 55 provides the appropriate information for the packet header to route the transmission to its final destination.

Similarly, if digital phone 45 that is administered on gateway 50 desires to communicate with an IP phone 46 that is administered on gateway 70, digital line card 58 takes digital data from the digital phone 45 and places it on the TDM bus 65. The call controller 55 of gateway 70 commands the VoIP interface card 51 to place the digital data from the TDM bus 65 into the payload of at least one RTP packet. The call controller 55 ensures that the appropriate routing information is in the packet header.

As described, the call controllers 55 route data between two endpoint devices, such as analog devices 41-44, digital devices 45, or IP devices 46, within the enterprise. The call controllers 55 also route data from an endpoint device 48 outside of the enterprise by using the PSTN. In this case, an analog trunk card 59 or a digital trunk card 60 takes the communication data from the PSTN 64 and places it on the TDM bus 61. The local call controller 55 commands the VoIP interface card 51 to place the media data into at least one RTP packet payload if the call is to an IP phone 46 or if the data needs to be routed to another gateway 50 via the Internet 63. At the far end of the call, gateway 50 allows for conversion of the RTP packet(s) to the appropriate protocol for play-out to the appropriate endpoint device 41-46.

Packet loss is an outside impairment that potentially affects all IP terminating equipment, such as gateways 50 and 70, or routers (80), on LAN 62. Customers and technicians often indict the enterprise IP terminating equipment. The various embodiments allow the customer, technician, and developers who are troubleshooting the problem to determine if the fault originated within or outside of the enterprise. Resolution of the problem is possible without the need to scour error logs 56.

For packet-loss detection caused from outside of the network, the troubleshooter may expose faults that are already monitored by gateways 50 and 70, which are handling the transmission of the caller who is experiencing the voice impairment. In one embodiment, referring to FIG. 3, in step 30, the troubleshooter, i.e., the technician or developer, may access the administration pages (not shown) of the local call controller 55 and selects a fault, i.e., error to expose. A fault may be a code number, series of code numbers, a title, or a grouping of errors under one header, etc. Accessing the administration pages can be done locally on the device or remotely over a LAN via a centralized server that also is used to administer other network communications equipment, or remotely via a web portal and the Internet. The actual administration can be performed via a command line interface or a graphical user interface (GUI).

One fault that may be exposed is an error code that tracks out-of-sequence RTP packets. The RTP sequence number resides in the RTP packet header and is used to detect packet-loss. Normally, the RTP sequence number increments by one for every packet that is sent. Hence, the RTP sequence number of the current packet minus the RTP sequence number of the previous packet should equal one in a well-behaved network. Otherwise, the packet stream was disrupted by packet loss or jitter. For further information, the troubleshooter may expose error codes that additionally track QoS levels and RTP stream reset (SSRC changes). The out-of-order (i.e., out-of-sequence) RTP packet may be computed by the VoIP interface board 51.

Another fault that may be exposed is an error code that tracks problems with the RTP packet header time-stamp, which corresponds to the time when the packet was sent out. The RTP packet header timestamp is used to detect clock drift between two systems, for example, gateways 50 and 70. Additionally, the RTP packet header time-stamp may be used to determine a design flaw in another system's transmitter, for example, the transmitter of a router that does RTP header compression.

Alternatively exposing an error code that tracks problems with the RTP packet header time-stamp, may indicate a lost packet. When the RTP packet stream enters the enterprise communications network gateway 50, there may be missing, i.e., lost packets due perhaps to network congestion from the Internet 63. At the VoIP interface board 51, there is a buffer containing the RTP packet payloads. The VoIP interface board 51 controls the media play-out to the TDM bus at the regular packet rate of 64 kbps. The VoIP interface board 51 determines when the buffer is emptying, i.e., playing out, faster than it is being filled with payload of voice data. The VoIP interface board 51 must react to the missing RTP packets. When packets are missing, the standard practice is to "fill-in-the-blanks", i.e., perform comfort-noise generation or packet-loss concealment. These methods allow the system to make up sounds by trying to predict what the missing packet voice samples may have contained, based on prior packet voice samples received. Packet-loss concealment is employed first to account for missing packets. For longer durations of missing packets, comfort-noise generation replaces packet-loss concealment.

In one embodiment, referring back to FIG. 3, in the event of a voice impairment on a converged network, the troubleshooter discusses the problem with the end user experiencing the problem. Based on this information, the troubleshooter may suspect one or more devices on the converged network that may be the source of the problem and will modify the behavior of an indicator on at least one device to behave differently when the next occurrence of the selected fault occurs. In step 31, the troubleshooter uses the command line interface or GUI interface, on the suspected device or via a separate network management device, to select an error code from a list of possible error codes that may be the possible cause of the problem. For example, based on the description of the problem the troubleshooter may suspect a router (80 shown in FIG. 4) on LAN 62. In this case, the troubleshooter may select error code 138, which indicates out-of-sequence RTP packets. In step 33, the troubleshooter selects an indicator and pattern from a list of possible notification indicators and possible notification patterns. For example, the troubleshooter may select one or more LEDs that are normally used to display the current call appearance line on endpoint device IP phone 46 as the notification indictor. For the notification pattern, the troubleshooter may select to flash a first LED on and off and to do so one or more times (ex. three times). At the next occurrence of error code 138, the call controller 55 will send a control message to endpoint device IP phone 46 to flash on and off three times the selected LED that is normally used to display the current call appearance line. The troubleshooter may then ask the customer, "At the endpoint device, did a first LED flash on and off three times when the voice impairment next occurred?" The customer may comment, "Yes, I saw the first LED flash on and off three times when the voice impairment next occurred." At this point, the troubleshooter knows that the problem was out-of-sequence RTP packets from the router 80. In step 37, the troubleshooter may return the LED to its original purpose. Alternatively, the call controller 55 may automatically return the notification indicator to its original purpose.

However, if the customer replies, "No I did not see the first LED flash on and off three times when the voice impairment next occurred," then the troubleshooter may not have selected the correct fault (i.e., possible cause of the problem) to expose and may not have selected the correct device to suspect. In this case, the troubleshooter returns to step 31 and decides to select error code 140 (ex. tracks problems with RTP packet header time-stamp) as the next fault to expose on the gateway 50.

In step 33, the troubleshooter will select from gateway 50 administration pages a notification indictor and pattern, such as dimming the IP phone 46 LCD display several times or scrolling a message across the LCD display. The troubleshooter will discuss with the customer the various notification methods and select a preferred method. For this customer, it may be scrolling a message across the LCD display. At the next occurrence of error code 140, which indicates a lost packet, the call controller 55 sends a control message to the endpoint device IP phone 46 to scroll a message (ex., "The gateway has diagnosed lost packets") across the LCD display. When the voice impairment next occurs during an individual call or a conference call, in step 35, either the customer may notify the troubleshooter of the voice impairment or the troubleshooter may remotely monitor the communications equipment and receive an alert, via any communications modality (ex. voice, fax, email, instant messaging, SMS text, page) that the indicator provided notification of the possible cause of the next occurrence of the problem. Both the customer and troubleshooter may use voicemail, email, instant messaging, etc., to communicate whether the customer saw a message scrolling across the LCD display while the voice impairment was occurring. If the customer says yes, he noticed the correlation, then in step 37 the troubleshooter can stop the modified behavior of the indicators and return all indicator(s) to their original use by deselecting the exposed error code and the notification indicator.

Alternatively, stored program code that is in a local or a centralized network management device, may iteratively perform the troubleshooting steps. For example, the troubleshooter may have previously directed the customer to press # on the endpoint device keypad if the LED flashed, press ## if the LED did not flash, and press #8 at the occurrence of the next voice impairment.

In this case, assume that the customer presses #8, which notifies the stored program code that the customer perceived a voice impairment problem. At this point, the stored program code is waiting for input from the customer as to whether the customer noticed that the LED flashed. When the customer presses ##, this notifies the stored program code that the exposed fault was not correctly selected or the originally suspect device is not the problem. In step 31, the stored program code then selects the next possible fault that affects voice quality of service, such as, packet loss, which is error code 140 and determines to monitor this error code from one or more network communication devices (ex. gateway 50 and router 80) it is responsible to manage on the network. In step 35, the stored program code also selects another notification method to notify the customer of the next occurrence of packet loss, such as, scrolling a text message across the customer's IP phone 46 display. The stored program code will send a message, such as via email, instant messaging, or voice messaging, alerting the customer to look for a text message (ex. "The network is experiencing packet loss") scrolling across the IP phone 46 display at the next occurrence of voice quality problems during an individual call or a conference call. This time, the customer is to press ##1 if the voice quality problem occurs but there are no flashing LEDs or the text message ("The network is experiencing packet loss") does not scroll across the display. The customer is to press #1 when the voice quality problem occurs and the text message ("The network is experiencing packet loss") scrolls across the LCD display. The customer is to press #2 when the voice quality problem occurs and the LED, normally used with a call appearance line, flashes on and off three times. The stored program code may copy the troubleshooter on the message sent to the customer.

At the next occurrence of voice quality problems during an individual call or a conference call, if the customer presses #1, then the text message ("The network is experiencing packet loss") scrolled across the display and the customer correlated the voice impairment with the text message scrolling across the display. At this point in step 35, the stored program code and the troubleshooter know that the source of the problem was packet loss. The stored program code collected the error code information from gateway 50 and router 80 and knows which device was the device diagnosing error code 140. In step 37, when the triage is completed, the troubleshooter or the stored program code may return the indicators to their original use.

Selecting notification indicators on endpoint devices is not limited to LEDs. The selection list of notification indicators may include existing display indicators (LCD or LED) on IP port circuits packs, such as on VoIP interface 51 or on a router 80.

The possible notification patterns may include the existing yellow status LED, or flashing the LED off for short periods-of-time while there is, for example, packet loss. For example, one short blink indicates small packet loss (<X), and two short blinks indicate greater packet loss (>X). The patterns can be set as desired, and the thresholds for each pattern can be set to a default or be adjusted by a technician or a system administrator. In an alternative embodiment, an IP port circuit pack may continue to use a yellow LED that is lit when a call or transmission is active to keep a technician from pulling the board when there is an active call or transmission on the board.

Additionally, the selection list of notification indicators can be extended to non-IP phones, such as to analog devices 41-44 or digital phones 45 with existing LED or LDC displays. The call controller 55 can send a control message to control the display to perform any type of pattern blink on an LED, scroll any message across an LCD display, give a short ring, or give a beep on the speaker.

Typically, the indicator's change in behavior as modified by the troubleshooter occurs after the fault happens once. Alternatively, if the fault occurs an administrable threshold number of times, the indicator's change in behavior may occur intermittently. In another alternative, the change in behavior may become semi-permanent if the fault continues to recur some administrable number of times.

Of course, various changes and modifications to the illustrative embodiment described above will be apparent to those skilled in the art. These changes and modifications can be made without departing from the spirit and the scope of the method and apparatus and without diminishing its attendant advantages. It is therefore intended that such changes and modifications be covered by the following claims except insofar as limited by the prior art.

What is claimed is:

1. A method of diagnosing problems, comprising the steps of:
   a processor indicating a first event with an indicator, wherein the first event is for communication equipment in a network, wherein the indicator only indicates the first event;
   the processor detecting a first occurrence of a problem with the communication equipment, wherein the first event is not associated with the problem and the first event is different than the problem, and wherein the indicator is not operable to indicate the occurrence of the problem;
   the processor reconfiguring the indicator to provide a notification of a possible cause of a next occurrence of the problem, wherein, after the indicator is reconfigured, the indicator is operable to indicate the problem but is not operable to indicate the first event; and
   in response to the next occurrence of the problem, the indicator providing the notification of the possible cause of the problem with the communication equipment.

2. The method of claim 1, further comprising the steps of:
correlating the next occurrence of the problem with the notification of the possible cause of the next occurrence of the problem; and
returning the indicator to indicate the first event after the problem is triaged.

3. The method of claim 1, wherein:
the notification is selected from a group comprising: an audible, visible, and tactile notification; and
the notification of the possible cause of the next occurrence of the problem occurs before returning the indicator to indicate the first event.

4. The method of claim 1, wherein the possible cause of the problem has an associated error code.

5. The method of claim 1, wherein the problem is intermittent.

6. The method of claim 1, wherein the device that provides the notification is selected from a group comprising: an endpoint device and a network communications device.

7. The method of claim 1, wherein the step of modifying the indicator's behavior comprises reprogramming the indicator's behavior.

8. The method of claim 1, wherein reconfiguring the indicator's behavior is selected from a group comprising: a semi-permanent change in behavior when the problem occurs once, and a change in behavior when the problem occurs after an administered threshold.

9. A tangible, non-transitory computer-readable medium comprising instructions to cause a processor to perform the method of claim 1.

10. An apparatus for diagnosing problems, comprising:
means for triggering an indicator to indicate a first event, in an absence of a problem, for a first purpose other than providing notification of a possible cause of the problem, wherein the first event occurs during normal operation; and
means for modifying a stored code program which manages the indicator's behavior in response to a first occurrence of the problem to provide a notification of a possible cause of a next occurrence of the problem, whereby the indicator is adapted to provide the notification of the possible cause of the next occurrence of the problem.

11. The apparatus of claim 10, further comprising:
means responsive to a later occurrence of the problem, for correlating the later occurrence of the problem with the notification of the possible cause of the next occurrence of the problem; and
means for returning the indicator to its first purpose after the problem is triaged.

12. The apparatus of claim 10, wherein the notification is selected from a group comprising: an audible, visible, and tactile notification.

13. A method of diagnosing problems in a suspect device operating in a communications network, comprising the steps of:
the communications network indicating a first event with a programmable indicator;
determining a first occurrence of a problem;
in response to determining the first occurrence of the problem in the communications network, a processor reprogramming stored code to change the indicator's behavior to provide a notification of the problem;
in response to a later occurrence of the problem in the communications network, the indicator providing the notification of the problem;
correlating the later occurrence of the problem with the notification;
triaging the problem; and
reconfiguring stored code to change the indicator to again indicate the first event after the problem is triaged.

14. A tangible, non-transitory computer-readable medium comprising instructions to cause a processor to perform the method of claim 13.

15. A system for assisting in diagnosis of problems, the system comprising:
a programmable indictor operable to indicate an event; and
at least one computer operable to:
determine a first occurrence of a problem;
reprogram stored program code associated with the programmable indicator's behavior to provide a notification of the problem, wherein the programmable indicator was not operable to provide the notification before reprogramming the stored program code;
reprogram the programmable indicator to provide a possible cause with the notification; and
reprogram the programmable indicator to return an indication of the event after the problem is triaged.

16. The system of claim 15, wherein:
the computer is responsive to a later occurrence of the problem, for correlating the later occurrence of the problem with a notification of a next occurrence of at least one fault that is possibly causing the problem.

17. The system of claim 15, wherein the notification is selected from a group comprising an audible notification means, a visible notification means, and a tactile notification means.

18. The system of claim 15, wherein a fault has an associated computer error code.

19. The system of claim 15, wherein the programmable indicator is included in a communication device.

20. The system of claim 15, wherein the reprogramming of stored program code associated with the programmable indicator's behavior is semi-permanent if the fault occurs once.

21. The system of claim 15, wherein the reprogramming of stored program code associated with the programmable indicator's behavior is semi-permanent if the fault occurs after an administrable number of times.

22. The apparatus of claim 15, wherein the reprogramming of stored program code associated with the indicator's behavior is effected after the fault has occurred an administrable number of times.

* * * * *